United States Patent
Yang

(10) Patent No.: US 10,920,879 B2
(45) Date of Patent: Feb. 16, 2021

(54) VEHICULAR TRANSMISSION

(71) Applicant: SL Corporation, Daegu (KR)

(72) Inventor: Jihoon Yang, Daegu (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 16/429,419

(22) Filed: Jun. 3, 2019

(65) Prior Publication Data

US 2020/0003300 A1 Jan. 2, 2020

(30) Foreign Application Priority Data

Jun. 28, 2018 (KR) .................. 10-2018-0074816

(51) Int. Cl.
| | |
|---|---|
| *F16H 61/22* | (2006.01) |
| *F16H 59/02* | (2006.01) |
| *F16H 1/32* | (2006.01) |
| *G01D 5/14* | (2006.01) |
| *F16H 59/10* | (2006.01) |

(52) U.S. Cl.
CPC .............. *F16H 61/22* (2013.01); *F16H 1/32* (2013.01); *F16H 59/105* (2013.01); *G01D 5/145* (2013.01); *F16H 2001/324* (2013.01); *F16H 2059/0295* (2013.01)

(58) Field of Classification Search
CPC ....... F16H 2059/081; F16H 2059/0295; F16H 61/22; F16H 2061/223; F16H 2035/001; F16H 2059/0282; F16H 2059/446; G05G 1/10; G05G 5/005; G05G 5/02; Y10T 74/2014; Y10T 74/20085
See application file for complete search history.

(56) References Cited

U.S. PATENT DOCUMENTS

| | | | | |
|---|---|---|---|---|
| 5,156,243 | A * | 10/1992 | Aoki ...................... | B60K 20/06 192/218 |
| 7,971,498 | B2 * | 7/2011 | Meyer ..................... | F16H 59/08 74/10.41 |
| 9,212,740 | B2 * | 12/2015 | Watanabe ............... | F16H 59/08 |
| 2015/0027861 | A1 * | 1/2015 | Hoskins .................. | F16H 59/08 200/43.11 |
| 2016/0312882 | A1 * | 10/2016 | Heo ........................ | F16H 61/24 |
| 2020/0096100 | A1 * | 3/2020 | Cha ......................... | F16H 61/22 |

\* cited by examiner

*Primary Examiner* — Bobby Rushing, Jr.
(74) *Attorney, Agent, or Firm* — Nelson Mullins Riley & Scarborough LLP; Kongsik Kim, Esq.

(57) ABSTRACT

A vehicular transmission includes a movable unit coupled to a lever and rotated to select one of a plurality of shift stages and including a first internal gear centered on a first axis, an eccentric gear unit centered on a second axis eccentric from the first axis and including a first external gear and a second external gear eccentrically engaged with the first internal gear, a rotation unit centered on the first axis and including a second internal gear eccentrically engaged with the second external gear, an insertion unit including an eccentric shaft inserted into a center of the eccentric gear unit and a central shaft inserted into a first aperture formed at a center of the rotation unit, and a locking unit configured to fix the rotation unit based on a source of a driving force for rotating the movable unit.

16 Claims, 11 Drawing Sheets

VEHICULAR TRANSMISSION

CROSS-REFERENCE TO RELATED APPLICATION

This application claims priority from Korean Patent Application No. 10-2018-0074816, filed on Jun. 28, 2018, the disclosure of which is incorporated herein by reference in its entirety.

BACKGROUND

1. Field of the Disclosure

The present disclosure relates to a vehicular transmission, and more particularly, to a vehicular transmission that enables a gear shift operation.

2. Description of the Related Art

Transmissions may change a gear ratio to maintain the constant rotation rate of an engine based on the speed of the vehicle, and a driver may operate a shift lever to change the gear ratio of the transmission. A gear shift mode of the transmission includes a manual gear shift mode in which the driver may change a shift stage, and an automatic gear shift mode in which the shift stage is automatically changed based on the speed of the vehicle when the driver selects a driving (D) stage.

Further, sports mode type transmissions capable of performing the manual gear shift and the automatic gear shift in a single transmission are used. In the sports mode type transmission, a transmission capable of performing the manual gear shift is provided beside a transmission that performs the automatic gear shift to allow the driver to perform the manual gear shift by increasing or decreasing the gear stages, while primarily performing the automatic gear shift.

The shift lever is exposed to the interior of the vehicle to allow it to be operated by the driver, and most of the shift levers are exposed between a center fascia and a console box of the vehicle. A floor-type transmission that is installed between the center fascia and the console box of a vehicle is commonly used. The floor-type transmission, however, makes it more difficult for passengers to move within the interior of the vehicle, and the space inside the vehicle is utilized less efficiently. Accordingly, it is not appropriate for recreational vehicles (RV). Therefore, a column-type transmission that is installed at the column of the steering wheel instead of the floor between a driver's seat and a front passenger seat is used. The column-type transmission frees valuable space in the interior of the vehicle and allows for efficient space utilization of the vehicle.

Such transmissions provide the function of automatically returning a shift lever to a park (P) stage when a vehicle is turned off at a shift stage other than the P stage. This is because when a driver turns off a vehicle at a shift stage other than the P stage, the driver must manually change the shift stage to the P stage for later driving. However, a feeling of operation generated when the shift lever is automatically returned to the P stage causes unnecessary noise or abrasion to transmission components. In addition, since the installation space of the column type transmission is relatively smaller than the installation space of the floor type transmission, there are limitations in installing components for a gear shift operation or for returning the shift lever in the limited installation space.

Therefore, a means is desired to prevent an unnecessary feeling of operation from being generated when the shift lever is returned to the P stage and to enable miniaturization to allow components for a gear shift operation or for returning the shift lever to be installed in a relatively small installation space as in the case of the column type transmission.

SUMMARY

Aspects of the present disclosure provide a vehicular transmission which can prevent an unnecessary feeling of operation from being generated when a shift lever is returned to a park (P) stage when a vehicle is turned off.

Aspects of the present disclosure also provide a vehicular transmission which enables miniaturization by reducing a space occupied by a structure for preventing a feeling of operation from being generated when a shift lever is returned to a P stage.

However, aspects of the present disclosure are not limited to those set forth herein. The above and other aspects of the present disclosure that have not been mentioned will become more apparent to one of ordinary skill in the art to which the present disclosure pertains by the detailed description of the present disclosure given below.

To achieve the above described object, according to an aspect of the present disclosure, a vehicular transmission may include a movable unit coupled to a lever operated by a driver and rotated to select one of a plurality of shift stages, the movable unit including a first internal gear centered on a first axis; an eccentric gear unit centered on a second axis eccentric from the first axis, the eccentric gear including a first external gear eccentrically engaged with the first internal gear and a second external gear integrally formed with the first external gear; a rotation unit centered on the first axis, the rotation unit including a second internal gear eccentrically engaged with the second external gear; an insertion unit including an eccentric shaft and a central shaft that are integrally formed, in which the eccentric shaft is inserted into a center of the eccentric gear unit, and the central shaft is inserted into a first aperture formed at a center of the rotation unit; and a locking unit configured to fix the rotation unit depending on a source of a driving force for rotating the movable unit. Further, the locking unit may include a moving rod configured to move in the direction of the first axis to fix the rotation unit; and an actuator configured to move the moving rod.

Other specific matters of the present disclosure are included in the detailed description and drawings.

According to the vehicular transmission of the present disclosure as described above, there are one or more of following effects. Since a driving force is transmitted through different paths when a lever is rotated by a driver and when the lever is returned to a P stage, a feeling of operation may be provided to the driver when the lever is operated by the driver while preventing unnecessary noise or abrasion by preventing generation of a feeling of operation when the lever is returned to the P stage. In addition, since a space occupied by a structure for preventing generation of a feeling of operation when the lever is returned to the P stage is reduced, the overall size may be reduced.

Effects of the present disclosure are not limited to the aforementioned effects, and other effects that have not been mentioned will be clearly understood by those skilled in the art from the scope of the appended claims.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
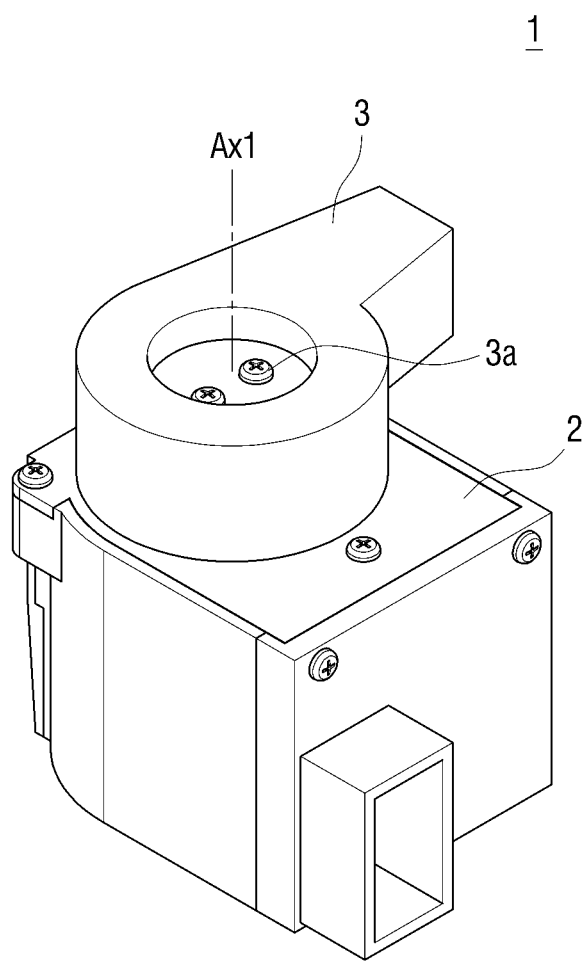
FIG. 1 is a perspective view illustrating an external appearance of a vehicular transmission according to an exemplary embodiment of the present disclosure.

Advantages and features of the present disclosure and methods of accomplishing the same will become more apparent with reference to exemplary embodiments to be described in detail in conjunction with the accompanying drawings. However, the present disclosure may be embodied in many different forms rather than being limited to the exemplary embodiments set forth herein, the present exemplary embodiments are provided to make the disclosure complete and to fully convey the concept of the present disclosure to those skilled in the art, and the present disclosure are solely defined by the scope of claims. The same reference numerals throughout the specification refer to the same components.

Thus, in some exemplary embodiments, well-known processing steps, well-known structures and well-known techniques will not be specifically explained in order to avoid ambiguous interpretation of the present disclosure.

The terms used herein explain the exemplary embodiments and are not intended to limit the present disclosure. As used herein, the singular forms also include plural forms, unless otherwise specified in the phrase. The expressions "comprise" and/or "comprising" used in the specification are used in the meaning that does not exclude the presence or addition of components, steps, operations and/or elements other than the mentioned components, steps, operations and/or elements. Further, the term "and/or" includes each of the mentioned items and one or more combinations thereof.

Further, the exemplary embodiments described herein will be described with reference to the cross-sectional views and/or the schematic views that are exemplary views of the present disclosure. Accordingly, the forms of the exemplary views may be modified by manufacturing techniques and/or tolerances. Accordingly, the exemplary embodiments of the present disclosure also include changes in forms generated based on the manufacturing process rather than being limited to the illustrated specific forms. Moreover, each component in the respective drawings illustrated in the present disclosure may be illustrated in an enlarged or a reduced manner in consideration of convenience of explanation. The same reference numerals throughout the specification refer to the same components.

Hereinafter, the present disclosure will be described with reference to the drawings for explaining a vehicular transmission by the exemplary embodiments of the present disclosure.

FIG. 1 is a perspective view illustrating an external appearance of a vehicular transmission according to an exemplary embodiment of the present disclosure. Referring to FIG. 1, in a vehicular transmission 1 according to an exemplary embodiment of the present disclosure, a lever 3 may be rotatably disposed on a side of a transmission housing 2. When a driver operates the lever 3, one of a plurality of shift stages may be selected by the rotation of the lever 3.

In the exemplary embodiment of the present disclosure, the shift stages that can be selected by the rotation of the lever 3 may include park (P), reverse (R), neutral (N), and drive (D). However, the shift stages that can be selected by the rotation of the lever 3 may vary, and some of the above-described shift stages may be selected by the operation of a button or a switch provided separately. In addition, although the vehicular transmission 1 according to the exemplary embodiment of the present disclosure may be of the column type installed in a column of a steering wheel of a vehicle in order to secure the interior space of the vehicle, the present disclosure is not limited thereto. A similar description may be applied to the floor type installed between a center fascia of a vehicle and a console box.

Figure 2:
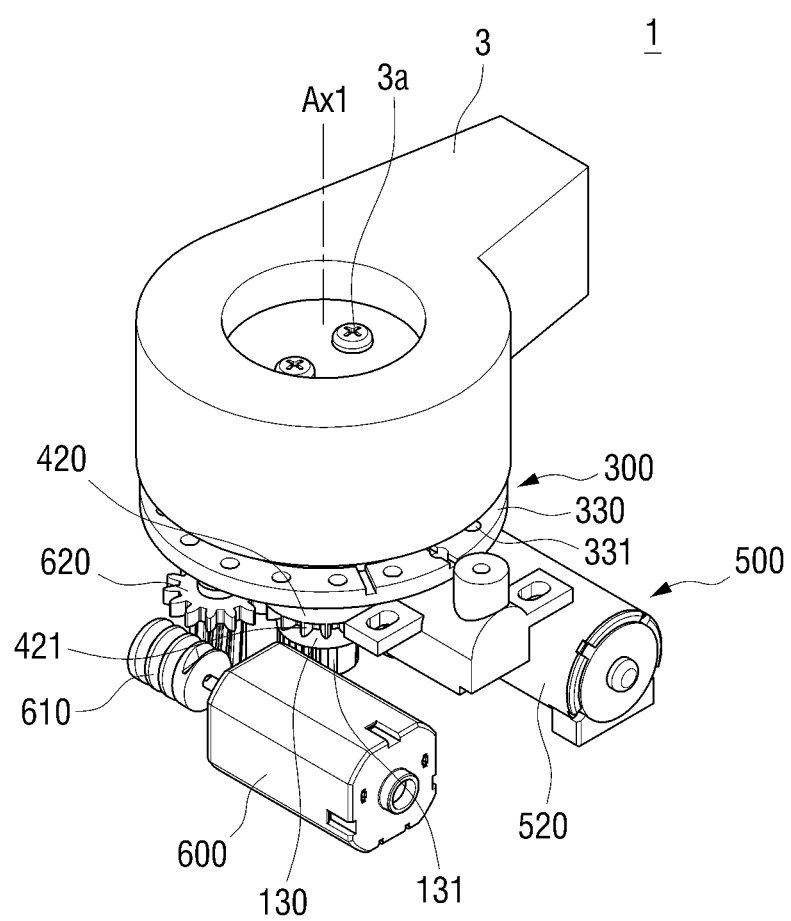
FIGS. 2 and 3 are perspective views illustrating the vehicular transmission according to an exemplary embodiment of the present disclosure.
Figure 3:
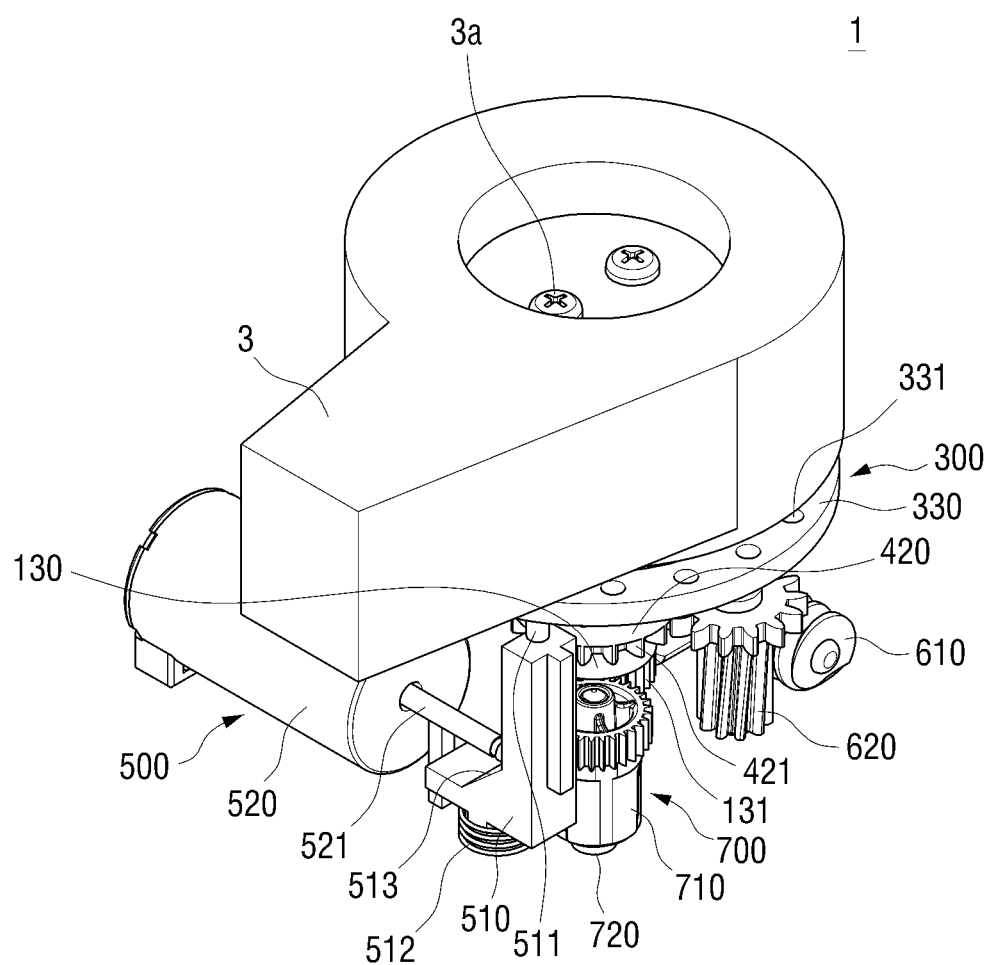
Figure 4:
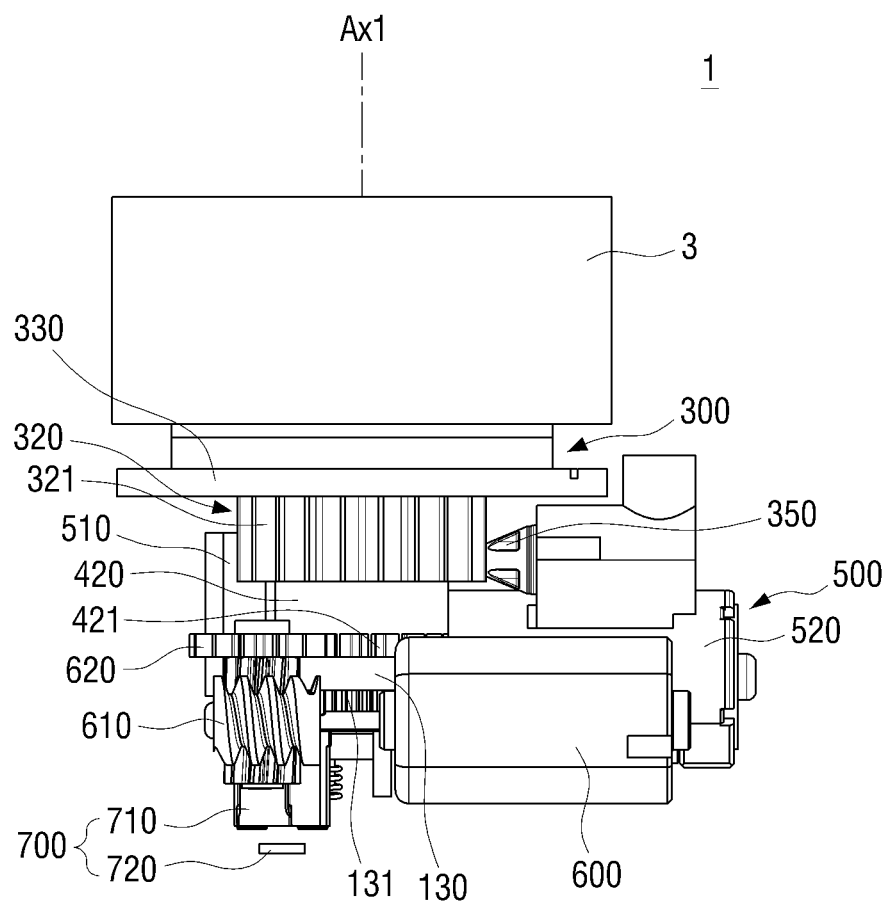
FIGS. 4 and 5 are side views illustrating the vehicular transmission according to an exemplary embodiment of the present disclosure.
Figure 5:
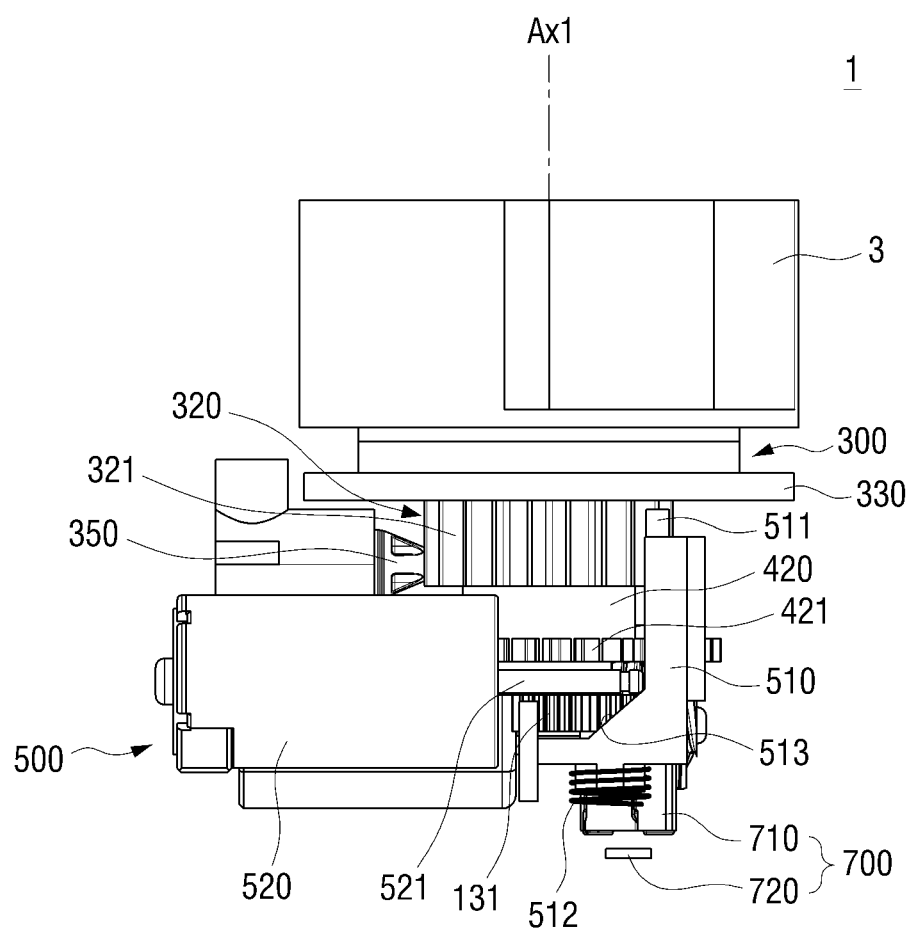
Figure 6:
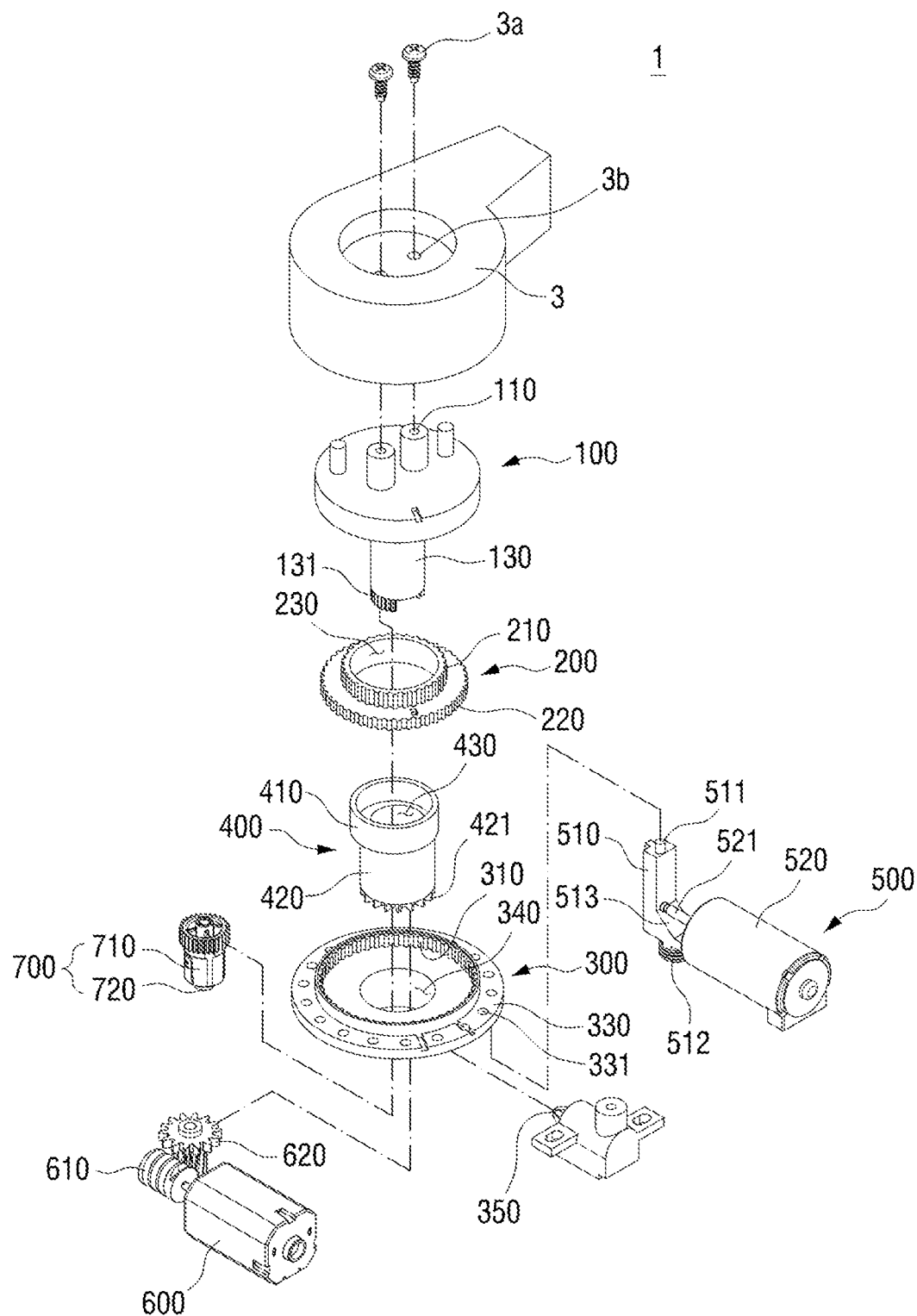
FIGS. 6 and 7 are exploded perspective views illustrating the vehicular transmission according to an exemplary embodiment of the present disclosure.
Figure 7:
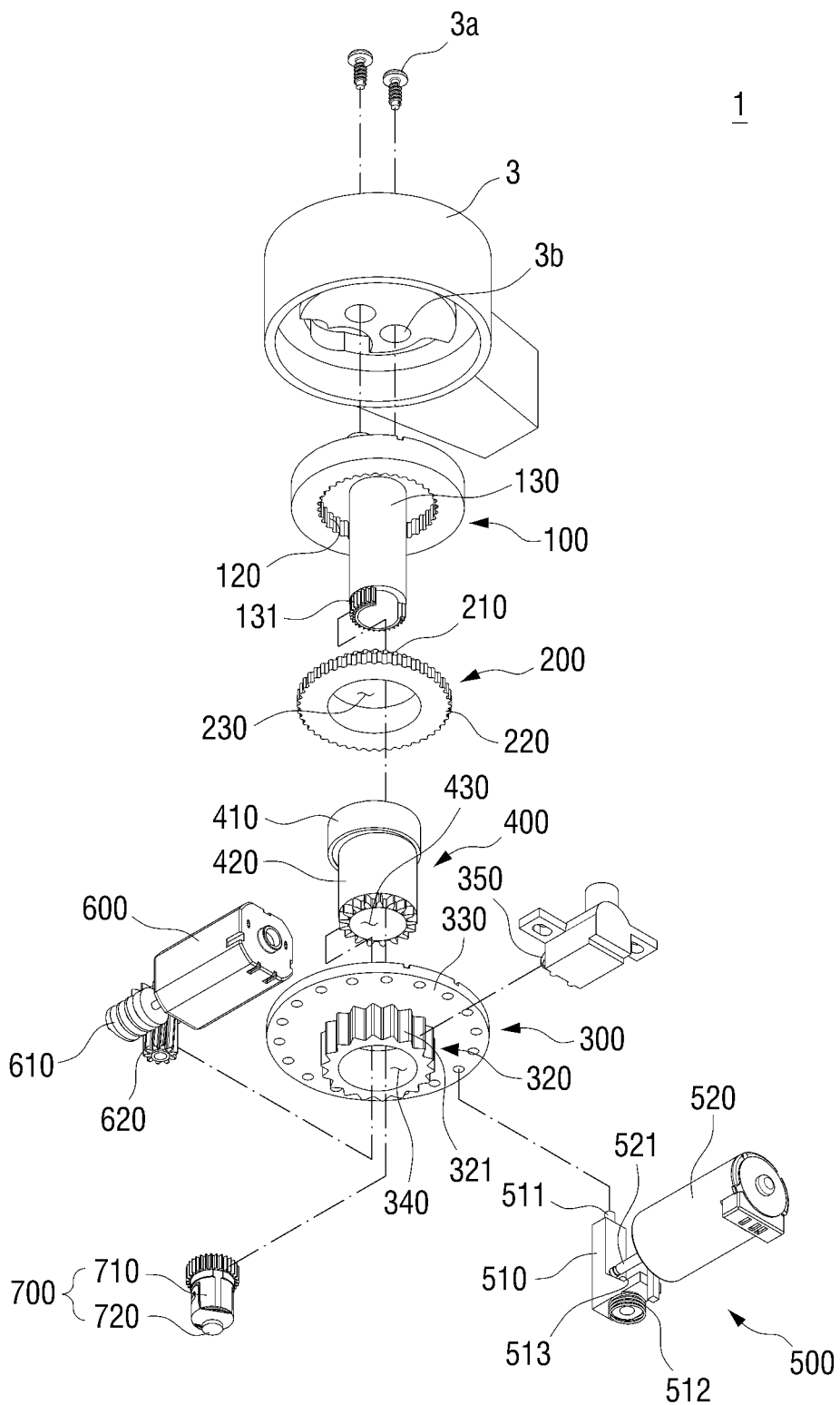
Figure 8:
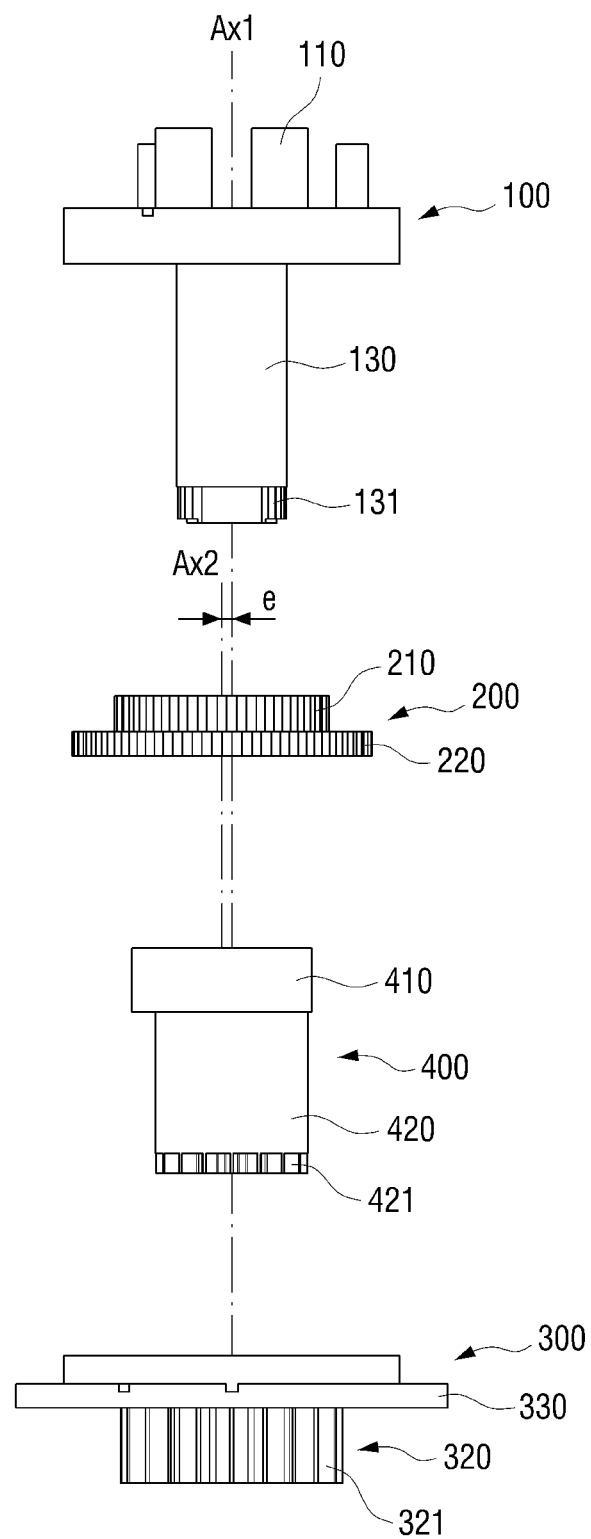
FIG. 8 is a schematic view illustrating a first axis and a second axis of the vehicular transmission according to an exemplary embodiment of the present disclosure.

FIGS. 2 and 3 are perspective views illustrating the vehicular transmission according to an exemplary embodiment of the present disclosure. FIGS. 4 and 5 are side views illustrating the vehicular transmission according to an exemplary embodiment of the present disclosure. FIGS. 6 and 7 are exploded perspective views illustrating the vehicular transmission according to an exemplary embodiment of the present disclosure. FIG. 8 is a schematic view illustrating a first axis and a second axis of the vehicular transmission according to an exemplary embodiment of the present disclosure. FIGS. 2 to 8 illustrate an example in which the transmission housing 2 is omitted.

Referring to FIGS. 2 to 8, the vehicular transmission 1 according to an exemplary embodiment of the present disclosure may include a movable unit 100, an eccentric gear unit 200, a rotation unit 300, an insertion unit 400, a locking unit 500, and a restoring unit 600. The movable unit 100 may be coupled to the lever 3 and rotate about a first axis Ax1 that serves as a rotational axis of the lever 3 to allow one of a plurality of shift stages to be selected. One or more screw grooves 110 to be screwed to the lever 3 may be formed in a surface of the movable unit 100 which faces the lever 3, and one or more screw apertures 3b may be formed in the lever 3 to allow one or more screws 3a to pass through the screw apertures 3b and engage with the screw grooves 110. In the exemplary embodiment of the present disclosure, the movable unit 100 may be screwed to the lever 3. However, the present disclosure is not limited thereto, and the movable unit 100 may also be coupled to the lever 3 using various coupling methods such as snap-fitting as well as screwing.

The movable unit 100 may include a first internal gear 120 centered on the first axis Ax1 and a movable shaft 130 that extends from a center of the internal gear 120 in the direction of the first axis Ax1. The eccentric gear unit 200 to be described later may be eccentrically engaged with the first internal gear 120 to allow the eccentric gear unit 200 to simultaneously rotate and revolve inside the first internal gear 120. This will be described in detail later. The movable shaft 130 may be integrally formed with the first internal gear 120 and thus may rotate about the first axis Ax1 together with the first internal gear 120. An end of the movable shaft 130 may be coupled to a sensing unit 700 for sensing a rotational direction and/or a rotational angle of the movable unit 100 to allow a shift stage to be determined based on the position of the movable unit 100.

In the exemplary embodiment of the present disclosure, a movable gear 131 for transmitting the rotational force of the movable unit 100 to the sensing unit 700 may be formed at the end of the movable shaft 130, and the sensing unit 700 may include a magnet gear 710 engaged with the movable gear 131 and a sensor 720 for sensing a change in magnetic force based on the rotation of the magnet gear 710. The magnet gear 710 may include a magnet whose position is changed based on the rotation of the movable shaft 130, and the sensor 720 may be, e.g., a Hall sensor that senses a change in magnetic force based on the rotation of the magnet gear 371.

In the exemplary embodiment of the present disclosure, the sensing unit 700 may determine the rotational direction, rotational angle, or the like of the movable unit 100 by sensing a change in magnetic force based on the position of the magnet included in the magnet gear 710. However, the present disclosure is not limited thereto, and the sensing unit 700 may also sense the rotational direction, rotational angle, or the like of the movable unit 100 in a contact or a contactless manner using a mechanical, electric, magnetic or optical sensor.

The eccentric gear unit 200 may include a first external gear 210 which is eccentrically engaged with the first internal gear 120 and a second external gear 220 which is centered on the same axis as the first external gear 210 and integrally formed with the first external gear 210. Herein, a description that the first external gear 210 and the second external gear 220 are integrally formed may refer to cases where there is no relative movement between the two gears, such as a case where the two gears are manufactured separately and then coupled to each other as well as a case where the two gears are integrally manufactured.

The eccentric gear unit 200 may include a third aperture 230 into which the end of the movable shaft 130 of the movable unit 100 is inserted to pass through the third aperture 230. The end of the movable shaft 130 is inserted into the third aperture 230 of the eccentric gear unit 200 to allow the first external gear 210 to be eccentrically engaged with the first internal gear 120. The first external gear 210 and the second external gear 220 may be centered on a second axis Ax2 that is offset from the first axis Ax1 by a predetermined eccentricity e. The eccentricity e may vary based on a design consideration such as a gear reduction ratio.

Figure 9:
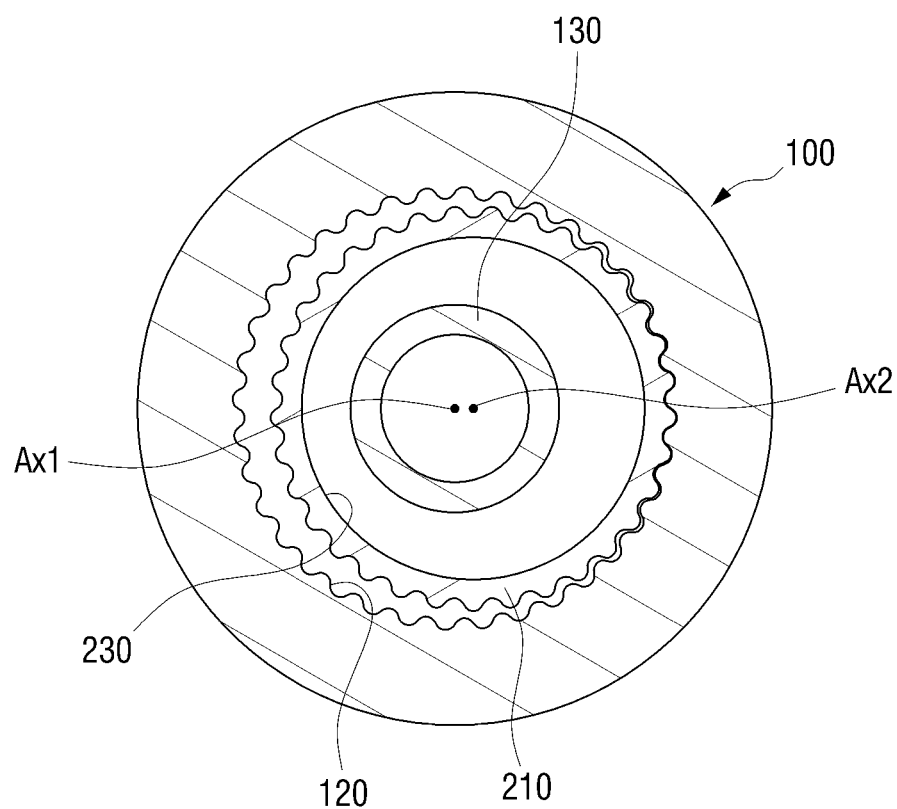
FIG. 9 is a cross-sectional view illustrating a first internal gear and a second external gear according to an exemplary embodiment of the present disclosure.

The first external gear 210 may have a smaller size (diameter) and a fewer number of teeth than the first internal gear 120 as illustrated in FIG. 9 and may rotate eccentrically by rotating about the second axis Ax2 inside the first internal gear 120 while revolving to allow the second axis Ax2 to revolve with a circular orbit around the first axis Ax1. In particular, the second axis Ax2 may be a center of each of the first external gear 210 and the second external gear 220. When the first external gear 210 rotates eccentrically, the second axis Ax2 may revolve to draw a circle around the first axis Ax1 without the position thereof being fixed with respect to the first axis Ax1. Therefore, the first external gear 210 may be understood as rotating about the second axis Ax2 that revolves about the first axis Ax1. When the movable unit 100 rotates, the rotation unit 300 may rotate together with the movable unit 100 or may be fixed without rotating. Whether the rotation unit 300 will rotate may be determined depending on a source of a driving force for rotating the movable unit 100.

Figure 10:
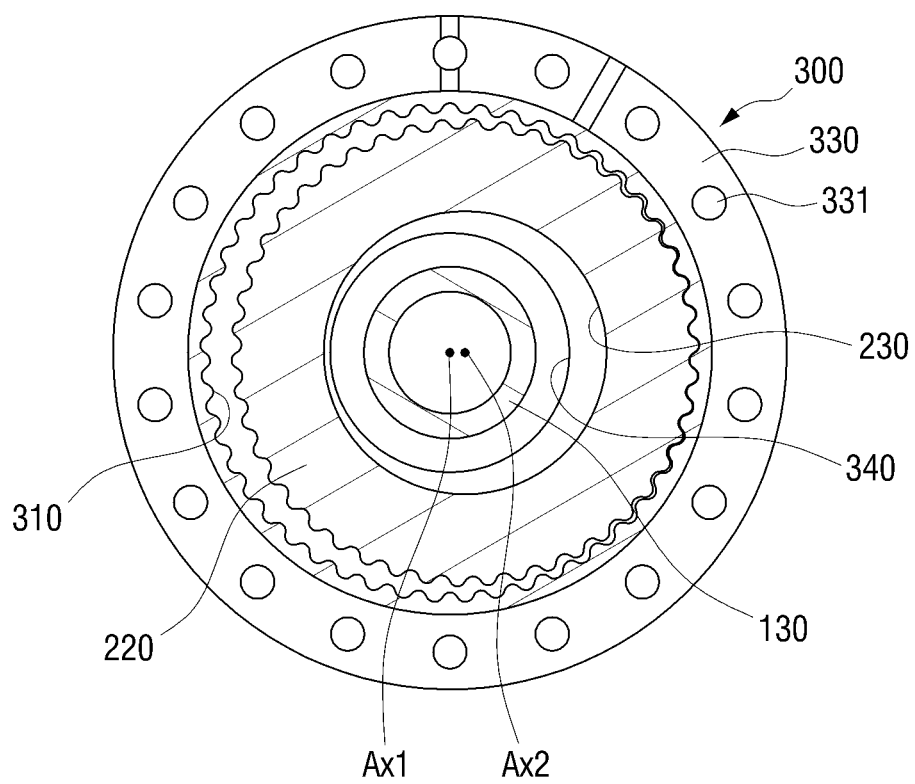
FIG. 10 is a cross-sectional view illustrating a second internal gear and a second external gear according to an exemplary embodiment of the present disclosure.

The rotation unit 300 may include a second internal gear 310, a detent portion 320, and a fixing portion 330. The second external gear 220 may be eccentrically engaged with the second internal gear 310, and a first aperture 340 may be formed in the rotation unit 300. The end of the movable shaft 130 of the movable unit 100 may be inserted into the aperture 310 to pass through the first aperture 340 to allow the first external gear 210 and the second external gear 220 of the eccentric gear unit 200 to be eccentrically engaged with the first internal gear 120 and the second internal gear 310, respectively. Like the first external gear 210 described above, the second external gear 220 may have a smaller size (diameter) and a fewer number of teeth than the second internal gear 310 as illustrated in FIG. 10 and may rotate eccentrically by rotating about the second axis Ax2 inside the second internal gear 310 while revolving to allow the second axis Ax2 to draw a circle around the first axis Ax1.

The detent portion 320 may serve to provide the driver with a feeling of operation (e.g., a haptic feedback, a sense of operation, or a haptic response) when the rotation unit 300 rotates. The detent portion 320 may be formed on a side of the rotation unit 300 in the direction of the first axis Ax1 and may have a smaller diameter than an overall diameter of the rotation unit 300. Therefore, since the space required to provide the driver with a feeling of operation may be reduced, the overall size of the vehicular transmission 1 according to an exemplary embodiment of the present disclosure may be reduced.

The detent portion 320 may include a plurality of detent grooves 321 formed along an outer circumferential surface, and a bullet 350 that is elastically supported by an elastic body such as a spring may be disposed on a side of the detent portion 320 while maintaining contact with the outer circumferential surface of the detent portion 320. The bullet 350 may be elastically supported by the elastic body to maintain contact with the outer circumferential surface of the detent portion 320. Therefore, when the rotation unit 300 rotates, the bullet 350 may move relatively from one of the detent grooves 321 to an adjacent one while maintaining contact with the detent grooves 321, thereby providing the driver with a feeling of operation.

The fixing portion 330 may be formed along an outer circumferential edge of the rotation unit 300, and the locking unit 500 to be described later may fix the rotation unit 300 to prevent the rotation unit 300 from rotating. The fixing portion 330 may include a plurality of fixing grooves 331 formed along the outer circumferential edge of the rotation unit 300, and a case where the rotation unit 300 is fixed by the fixing portion 330 will be described in detail later.

The insertion unit 400 may include an eccentric shaft 410 inserted into a center of the eccentric gear unit 200 and a central shaft 420 inserted into a center of the rotation unit 300. The eccentric shaft 410 and the central shaft 420 may be integrally formed in a direction parallel to the first axis Ax1. The insertion unit 400 may have a second aperture 430 into which the movable shaft 130 of the movable unit 100 is inserted to pass through the second aperture 430, and the eccentric shaft 410 may be connected to the central shaft 420 through the first aperture 340 of the rotation unit 300. The eccentric shaft 410 may be inserted into the third aperture 230 of the eccentric gear unit 200, and the end of the movable shaft 130 may pass through the second aperture 430 of the insertion unit 400 having the eccentric shaft 410 inserted into the third aperture 230 of the eccentric gear unit 200 and may be coupled to the sensing unit 700.

A driving gear 421 may be formed at an end of the central shaft 420 to receive a driving force from the restoring unit 600 to be described later. When a driving force is generated from the restoring unit 600, the central shaft 420 may rotate about the first axis Ax1 to allow the eccentric gear unit 200 having the eccentric shaft 410 inserted thereinto through the third aperture 230 may rotate eccentrically. In other words, since a center of the eccentric shaft 410 and a center of the central shaft 420 are eccentric from each other, when the central shaft 420 is rotated about the first axis Ax1 by the restoring unit 600, the eccentric gear unit 200 may rotate eccentrically by rotating about the second axis Ax2 while revolving to allow the second axis Ax2 to draw a circle around the first axis Ax1.

When the movable unit 100 is rotated by a driving force generated by the driver's operation, the insertion unit 400 may be fixed and prevented from rotating. When a driving force is generated from the restoring unit 600 to be described later, the insertion unit 400 may cause the eccentric gear unit 200 to rotate eccentrically to rotate the movable unit 100 at a predetermined reduction ratio. In other words, the insertion unit 400 may be fixed not to rotate when a driving force for rotating the movable unit 100 is generated by the driver's operation and may be rotated when the driving force for rotating the movable unit 100 is generated by the restoring unit 600.

The locking unit 500 may include a moving rod 510 which is configured to be moved in the direction of the first axis Ax1 and an actuator 520 which is configured to move the moving rod 510. In the exemplary embodiment of the present disclosure, the moving rod 510 may extend in the direction parallel to the first axis Ax1 and may be moved in the direction parallel to the first axis Ax1 to allow the rotation of the rotation unit 300 or to fix the rotation unit 300.

An insertion protrusion 511 configured to be inserted into one of the fixing grooves 331 may be formed at an end of the moving rod 510. When the moving rod 510 is moved in a direction approaching the rotation unit 300, the insertion protrusion 511 may be inserted into one of the fixing grooves 331, thereby fixing the rotation unit 300 to prevent the rotation unit 300 from rotating. Conversely, when the moving rod 510 is moved in a direction away from the rotation unit 300, the insertion protrusion 511 may be disengaged from the fixing grooves 331, thereby allowing the rotation unit 300 to be rotated.

In the exemplary embodiment of the present disclosure, since the moving rod 510 moves in the direction parallel to the first axis Ax1, the moving rod 510 may allow the rotation unit 300 to be rotated or fix the rotation unit 300 from being rotated while operating within a radius smaller than a radius from the first axis Ax1 to the outer circumferential edge of the rotation unit 300. Therefore, the overall size of the vehicular transmission 1 of the present disclosure may be reduced. In other words, when the moving rod 510 is moved in the direction parallel to the first axis Ax1, the moving rod 510 may move within a relatively small radius from the first axis Ax1 as compared with when the moving rod 510 is moved in a direction intersecting (e.g., perpendicular to) the first axis Ax1. Therefore, the overall size of the vehicular transmission 1 of the present disclosure may be prevented from being increased due to the structure for allowing the rotation unit 300 to be rotated or fixing the rotation unit 300 from being rotated. This can ease constraints on installation space for a type installed in a relatively small space, such as the column type.

An elastic member 512 for elastically supporting the moving rod 510 may be disposed at the other end of the moving rod 510. The moving rod 510 may be moved by the actuator 520 in a direction in which the elastic member 512 is compressed to allow the rotation unit 300 to be rotated or may be moved by the restoring force of the elastic member 512 to fix the rotation unit 300 from being rotated.

The actuator 520 may include a shaft 521 which moves in a direction perpendicular to the movement direction of the moving rod 510, and the shaft 521 may be positioned to allow an end of the shaft 521 to abut an inclined surface 513 formed on a side surface with respect to the movement direction of the moving rod 351. The inclined surface 513 may be inclined with respect to the direction of the first axis Ax1 to have a slope such that it becomes closer to the actuator 510 from a first side close to the rotation unit 300 toward a second side far from the rotation unit 300. Accordingly, the moving rod 510 may be moved in the direction parallel to the first axis Ax1 depending on a position at which the end of the shaft 521 of the actuator 520 contacts the inclined surface 513.

Figure 11:
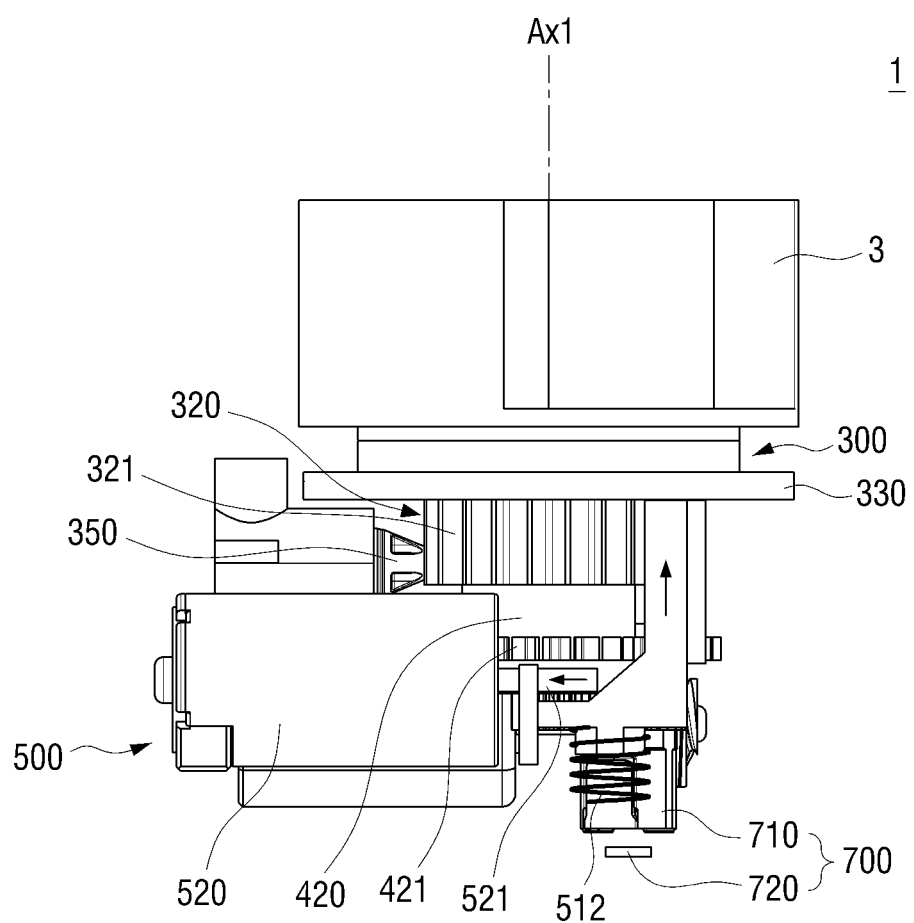
FIG. 11 is a side view illustrating a locking unit in which a moving rod for fixing a rotation unit is moved according to an exemplary embodiment of the present disclosure.

For example, as illustrated in FIG. 11, when the end of the shaft 521 of the actuator 520 is moved in a direction away from the moving rod 510, a position at which the end of the shaft 521 contacts the inclined surface 513 becomes closer to the second side of the inclined surface 513. In this case, the moving rod 510 may be moved by the restoring force of the elastic member 512 in the direction approaching the rotation unit 300. Accordingly, the insertion protrusion 511 may be inserted into one of the fixing grooves 331, thereby fixing the rotation unit 300 from being rotated. Conversely, when the end of the shaft 521 of the actuator 520 is moved in a direction approaching the moving rod 510, the position at which the end of the shaft 521 contacts the inclined surface 513 becomes closer to the first side of the inclined surface 513. In this case, the elastic member 512 may be compressed as in FIG. 5 described above. Accordingly, the moving rod 510 may move in the direction away from the rotation unit 300, thereby allowing the rotation unit 300 to be rotated.

Therefore, the locking unit 500 may allow the rotation unit 300 to be rotated or may fix the rotation unit 300 from being rotated in order to generate a feeling of operation or prevent generation of an unnecessary feeling of operation depending on the source of a driving force for rotating the movable unit 100. In other words, when the driver operates the lever 3 to rotate the movable unit 100, the rotation unit 300 may be rotated to generate a feeling of operation to allow the driver to recognize a shifting operation. Conversely, when the lever 3 is returned to a preset shift stage when the vehicle is turned off or in response to an operation command, the rotation unit 300 may be fixed and prevented from generating an unnecessary feeling of operation, thereby reducing noise and/or abrasion.

In the exemplary embodiment of the present disclosure, the actuator 520 of the locking unit 500 may be a bidirectional solenoid which is supplied with power during the movement of the moving rod 510 and, after the movement of the moving rod 510 is completed, maintains the moving rod 510 at the current position by preventing the moving rod 510 from returning to a previous position even when the power supply is discontinued. A general solenoid is a unidirectional solenoid that converts an electrical signal into a linear motion. In the general solenoid, power is continuously supplied to move a plunger toward one side, and the power is discontinued to move the plunger toward the other side which is the original position. Therefore, the unidirectional solenoid requires continuous power supply in order to maintain the plunger at the one side. However, in the exemplary embodiment of the present disclosure, the actuator 520 of the locking unit 500 may be supplied with power only during the movement of the moving rod 510. Consequently, power consumption may be reduced, and heat generation may be reduced.

In addition, in the exemplary embodiment of the present disclosure, the actuator 520 may be positioned to allow the shaft 521 to be moved in the direction perpendicular to the movement direction of the moving rod 510. However, the present disclosure is not limited thereto, and the actuator 520 may also be positioned to allow the shaft 521 to be moved along the movement direction of the moving rod 510. In this case, the shaft 521 may be integrally formed with the moving rod 510 to move the shaft 521 and the moving rod 510 as a single piece.

In the exemplary embodiment of the present disclosure, the locking unit 500 may allow the rotation unit 300 to be rotated or may fix the rotation unit 300 from being rotated depending on a source of a driving force for rotating the movable unit 100. However, the present disclosure is not limited thereto, and the locking unit 500 may also allow a switch from one of a plurality of shift stages to another based on at least one shift condition (e.g., the vehicle speed or whether the brake pedal is operated). For example, when the vehicle speed at the P stage is equal to or less than a predetermined reference speed and the brake pedal is operated, the locking unit 500 may allow another shift stage to be selected.

The restoring unit 600 may return the lever 3 to a preset shift stage when the vehicle is turned off or when an operation command is received. In the exemplary embodiment of the present disclosure, the restoring unit 600 may cause the lever 3 to automatically return to the P stage when the driver disembarks from the vehicle after turning off the vehicle at a non-parking stage (e.g., R, N or D stage). However, this is merely an example used to help understand the present disclosure, and the restoring unit 600 may also cause the lever 3 to return to a shift stage that corresponds to an operation command.

The restoring unit 600 may generate a driving force when the lever 3 is automatically returned to the P stage, and the driving force generated from the restoring unit 600 may be transmitted to the insertion unit 400. In particular, the driving force generated from the restoring unit 600 may be transmitted to the driving gear 421 disposed at the end of the central shaft 420 via one or more transmission gears 610 and 620. In this case, the eccentric shaft 410 integrally formed with the central shaft 420 may cause the eccentric gear unit 200 to rotate eccentrically by rotating about the second axis Ax2 while revolving such that the second axis Ax2 draws a circle around the first axis Ax1. Accordingly, the movable unit 100 may be rotated at a predetermined reduction ratio to return to the P stage. In addition, when the driver selects one of the shift stages by operating the lever 3, the operation of the restoring unit 600 may be stopped to allow the insertion unit 400 to remain fixed without being rotated.

In the vehicular transmission 1 according to the exemplary embodiment of the present disclosure described above, a driving force to rotate the movable unit 100 may be transmitted through different transmission paths depending on the source of the driving force and the operation of the restoring unit 600.

First, when the driver operates the lever 3 to rotate the movable unit 100, i.e., when the driving force for rotating the movable unit 100 is generated by the driver's operation, the insertion unit 400 may remain fixed without being rotated since the restoring unit 600 does not operate. When the insertion unit 400 is fixed, the eccentric gear unit 200 may be prevented from rotating eccentrically. Therefore, relative movement between the movable unit 100 and the rotation unit 300 may be prevented. Hence, the driving force generated by the driver's operation is transmitted to the rotation unit 300 through the movable unit 100 and the eccentric gear unit 200 to allow the movable unit 100 and the rotation unit 300 to be rotated together at the same speed. When the rotation unit 300 rotates, the bullet 350 may be relatively moved from one of the detent grooves 321 to an adjacent one, thus generating a feeling of operation as the driver operates the lever 3. As a result, the driver can recognize a shift operation. Further, the moving rod 510 of the locking unit 500 may be moved in the direction away from the rotation unit 300. Accordingly, the insertion protrusion 511 may be disengaged from the fixing grooves 331 as in FIG. 5 described above, thus allowing the rotation unit 300 to be rotated. As a result, the movable unit 100 and the rotation unit 300 can be rotated together at the same speed.

On the other hand, when the lever 3 is automatically returned to the P stage, i.e., when a driving force is generated from the restoring unit 600 to rotate the insertion unit 400, the moving rod 510 may move in the direction approaching the rotation unit 300 as in FIG. 11 described above to insert the insertion protrusion 511 into one of the fixing grooves 331. Accordingly, the rotation unit 300 may remain fixed without being rotated. Since the insertion unit 400 is rotated by the restoring unit 600, the first external gear 210 may rotate eccentrically inside the first internal gear 120, and the second external gear 220 may rotate eccentrically inside the second internal gear 310. Consequently, the driving force of the restoring unit 600 may be transmitted to the movable unit 100 at a predetermined reduction ratio to rotate the movable unit 100.

The reduction ratio may be determined based on a first gear ratio between the first internal gear 120 and the first external gear 210 and a second gear ratio between the second internal gear 310 and the second external gear 220. The gear ratios may be appropriately adjusted based on the required rotation speed of the lever 3 when the lever 3 is returned to the P stage. Therefore, in the exemplary embodiment of the present disclosure, since the center of the eccentric gear unit 200 is eccentric from a center of the movable unit 100, a sufficient speed reduction effect may be obtained when the lever 3 is returned to a preset shift stage by the restoring unit 600. In addition, a high gear ratio can be obtained without increasing a difference in diameters between gears that mesh with each other, which is advantageous for miniaturization.

Further, when the lever 3 is returned to the preset shift stage by the restoring unit 600, the rotation unit 300 may be fixed and prevented from being rotated. Accordingly, noise or abrasion due to the generation of an unnecessary feeling of operation may be prevented or reduced.

Moreover, the moving rod 510 of the locking unit 500 which allows the rotation unit 300 to be rotated or fixes the rotation unit 300 to prevent the rotation unit 300 from being rotated depending on the source that generates a driving force for rotating the movable unit 100 may extend in the direction parallel to the first axis Ax1 and move in the direction parallel to the first axis Ax1. Therefore, the moving rod 510 may move within a relatively small radius from the first axis Ax1 as compared with when moving in the direction intersecting the first axis Ax1. This configuration may reduce the space required for the structure for fixing the rotation unit 300, thereby reducing the overall size. Accordingly, space utilization may be improved in a type installed in a relatively small space, such as the column type.

While the present disclosure has been particularly illustrated and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. A vehicular transmission comprising:
    a movable unit coupled to a lever and rotated to select one of a plurality of shift stages, the movable unit comprising a first internal gear centered on a first axis;
    an eccentric gear unit centered on a second axis eccentric from the first axis, the eccentric gear unit comprising a first external gear eccentrically engaged with the first internal gear and a second external gear integrally formed with the first external gear;
    a rotation unit centered on the first axis, the rotating unit comprising a second internal gear eccentrically engaged with the second external gear;
    an insertion unit comprising an eccentric shaft and a central shaft that are integrally formed, wherein the eccentric shaft is inserted into a center of the eccentric gear unit, and the central shaft is inserted into a first aperture formed at a center of the rotation unit; and
    a locking unit configured to fix the rotation unit depending on a source of a driving force for rotating the movable unit, wherein the locking unit comprises a moving rod configured to move in the direction of the first axis to fix the rotation unit, and an actuator configured to move the moving rod,
    wherein the actuator comprises a shaft which is moved in a direction perpendicular to a movement direction of the moving rod, and the moving rod comprises an inclined surface that an end of the shaft contacts.

2. The vehicular transmission of claim 1, wherein the movable unit comprises a movable shaft which extends from a center of the first internal gear in the direction of the first axis, and the insertion unit comprises a second aperture through which an end of the movable shaft passes to be coupled to a sensing unit for sensing a position of the movable unit.

3. The vehicular transmission of claim 2, wherein the sensing unit comprises:
    a magnet gear meshed with a movable gear disposed at an end of the movable shaft; and
    a sensor which senses a change in magnetic force based on a rotation of the magnet gear.

4. The vehicular transmission of claim 1, wherein the moving rod is moved within a radius smaller than a radius from the first axis to an outer circumferential edge of the rotation unit.

5. The vehicular transmission of claim 1, wherein the moving rod extends in the direction of the first axis, and an insertion protrusion is formed at an end thereof which is close to the rotation unit, wherein the insertion protrusion is configured to be inserted into one of a plurality of fixing grooves formed along an outer circumferential edge of the rotation unit.

6. The vehicular transmission of claim 5, wherein the locking unit further comprises an elastic member disposed at the other end of the moving rod for elastically supporting the moving rod.

7. The vehicular transmission of claim 1, wherein the inclined surface slopes with respect to the direction of the first axis to become closer to the actuator from a first side close to the rotation unit toward a second side far from the rotation unit, and the position of the moving rod is configured to be changed based on a position to which the end of the shaft contacts the inclined surface.

8. The vehicular transmission of claim 1, further comprising a restoring unit which generates a driving force for returning the lever to a preset shift stage, wherein the driving force generated from the restoring unit is transmitted to the insertion unit to cause the eccentric gear unit to rotate about the second axis while revolving around the first axis to allow the second axis to draw a circle around the first axis.

9. The vehicular transmission of claim 8, wherein, when the movable unit is rotated by an external driving force applied through the lever, the restoring unit fixes the insertion unit to prevent the insertion unit from being rotated.

10. The vehicular transmission of claim 8, wherein the restoring unit comprises at least one transmission gear which is meshed with a driving gear disposed at an end of the central shaft.

11. The vehicular transmission of claim 8, wherein the restoring unit is configured to generate the driving force to return the lever from a non-parking stage to a parking stage.

12. The vehicular transmission of claim 8, wherein, when the driving force is generated from the restoring unit, the first external gear and the second external gear rotate about the second axis inside the first internal gear and the second internal gear, respectively, while revolving around the first axis to allow the second axis draw a circle around the first axis.

13. The vehicular transmission of claim 11, wherein the movable unit rotates at a reduction ratio determined based on a first gear ratio between the first internal gear and the first external gear and a second gear ratio between the second internal gear and the second external gear.

14. The vehicular transmission of claim 8,
    wherein, when movable unit is rotated by an external driving force applied through the lever, the locking unit allows the rotation unit to be rotated, and
    wherein, when the driving force is generated from the restoring unit, the locking unit fixes the rotation unit to prevent the rotation unit from being rotated.

15. The vehicular transmission of claim 1, further comprising:
    a detent portion which is formed on a side of the rotation unit in the direction of the first axis and has a smaller diameter than an overall diameter of the rotation unit; and
    a bullet disposed on a side of the detent portion to contact the detent portion.

16. The vehicular transmission of claim 15, wherein a plurality of detent grooves are formed along an outer circumferential edge of the detent portion, and the bullet is elastically supported to maintain contact with the detent portion during a rotation of the rotation unit.

* * * * *